United States Patent [19]

White

[11] 4,171,159
[45] Oct. 16, 1979

[54] OPTICAL HOMODYNE MICROSCOPE

[76] Inventor: Matthew B. White, 258 Forest Ave., Cohasset, Mass. 02025

[21] Appl. No.: 815,879

[22] Filed: Jul. 14, 1977

[51] Int. Cl.$^2$ .............................................. G01B 9/02
[52] U.S. Cl. ..................................... 356/349; 356/360; 73/657
[58] Field of Search .................. 356/109, 106 R, 349, 356/360; 73/657

[56] References Cited

U.S. PATENT DOCUMENTS

| | | | |
|---|---|---|---|
| 3,435,656 | 4/1969 | Jordan et al. ........................... | 73/657 |
| 3,780,217 | 12/1973 | Sawatari ............................. | 356/109 |
| 3,879,988 | 4/1975 | Jacobs ................................. | 73/657 |
| 3,954,322 | 5/1976 | Aleksoff et al. ..................... | 356/109 |

*Primary Examiner*—Conrad J. Clark
*Attorney, Agent, or Firm*—R. S. Sciascia; L. I. Shrago; C. E. Vautrain, Jr.

[57] ABSTRACT

An optical homodyne microscope is disclosed which detects phase modulation of the optical radiation that is reflected from an object under study which is in a state of periodic motion. The dimensions of the object may be smaller than the optical wavelength with this technique. By analyzing the resultant phase modulation spectrum, information concerning the shape of the object can be obtained.

20 Claims, 11 Drawing Figures

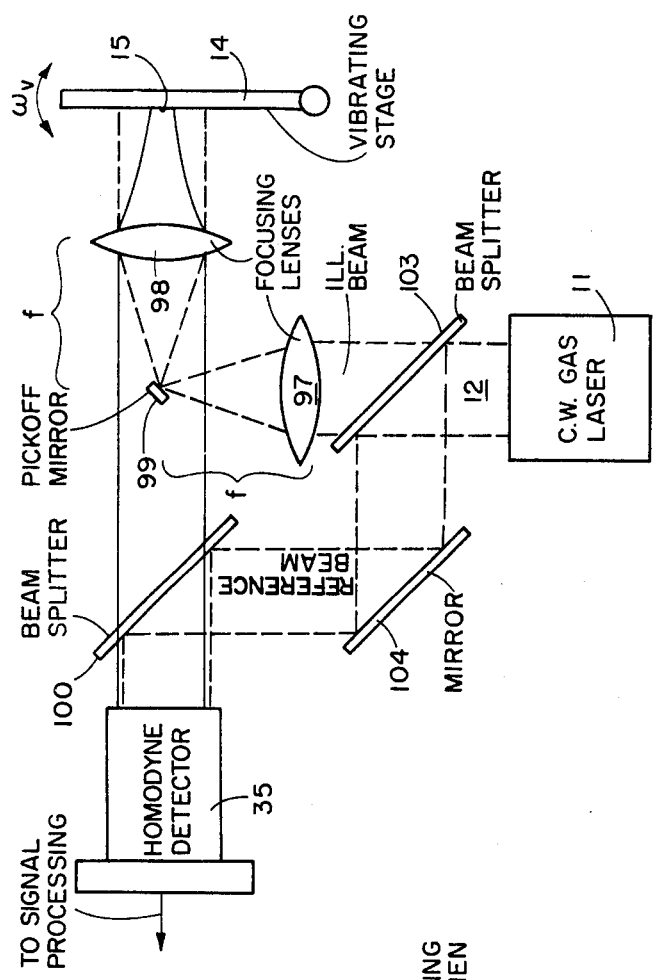
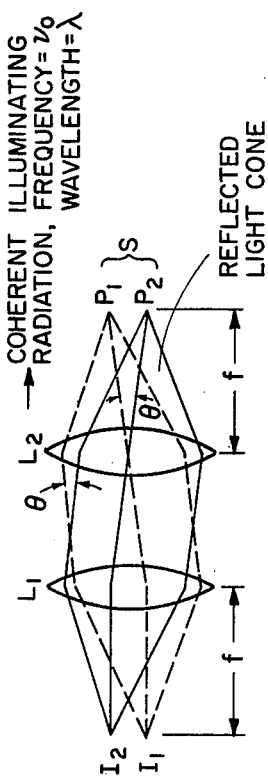
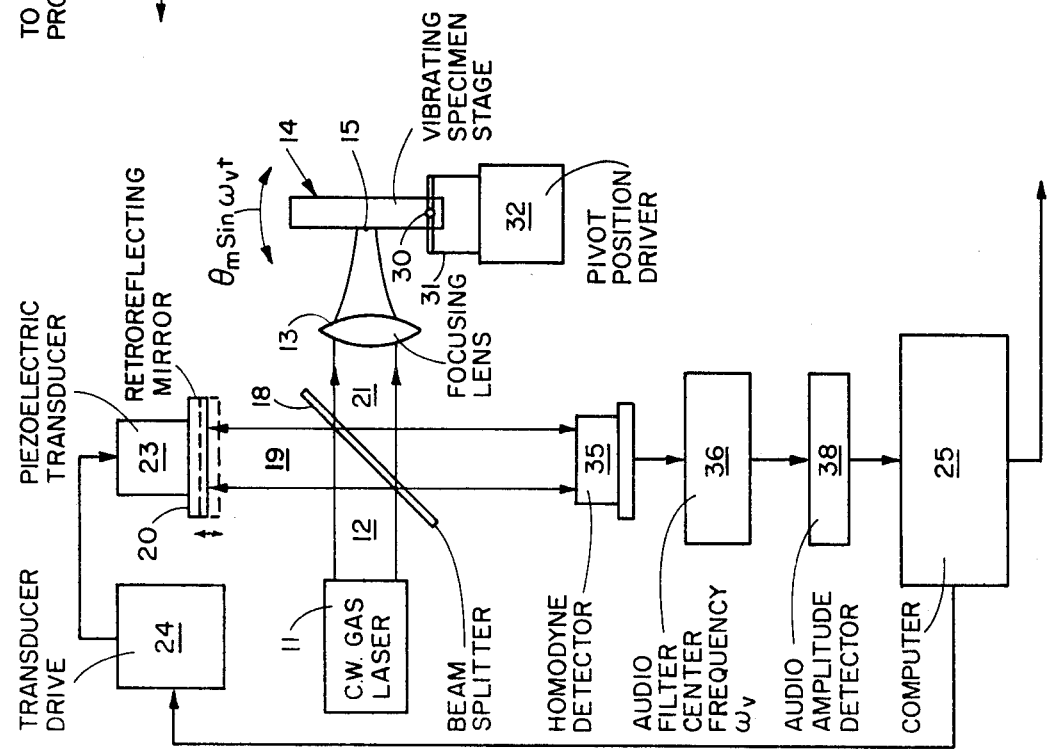

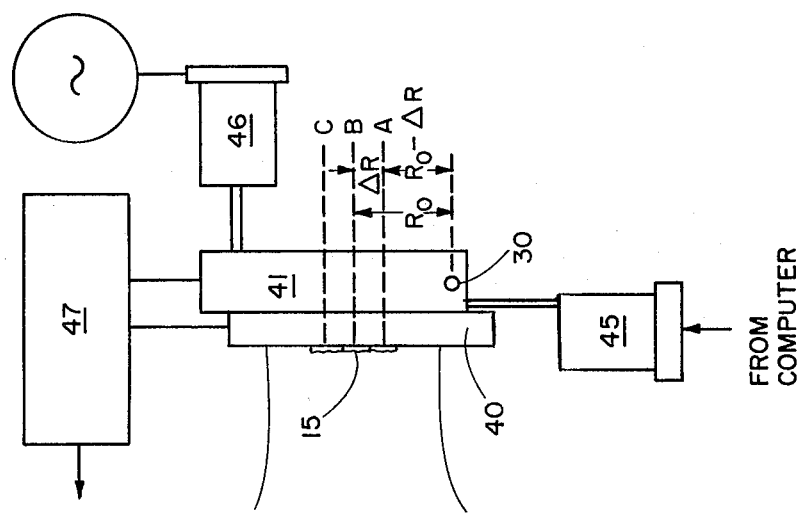
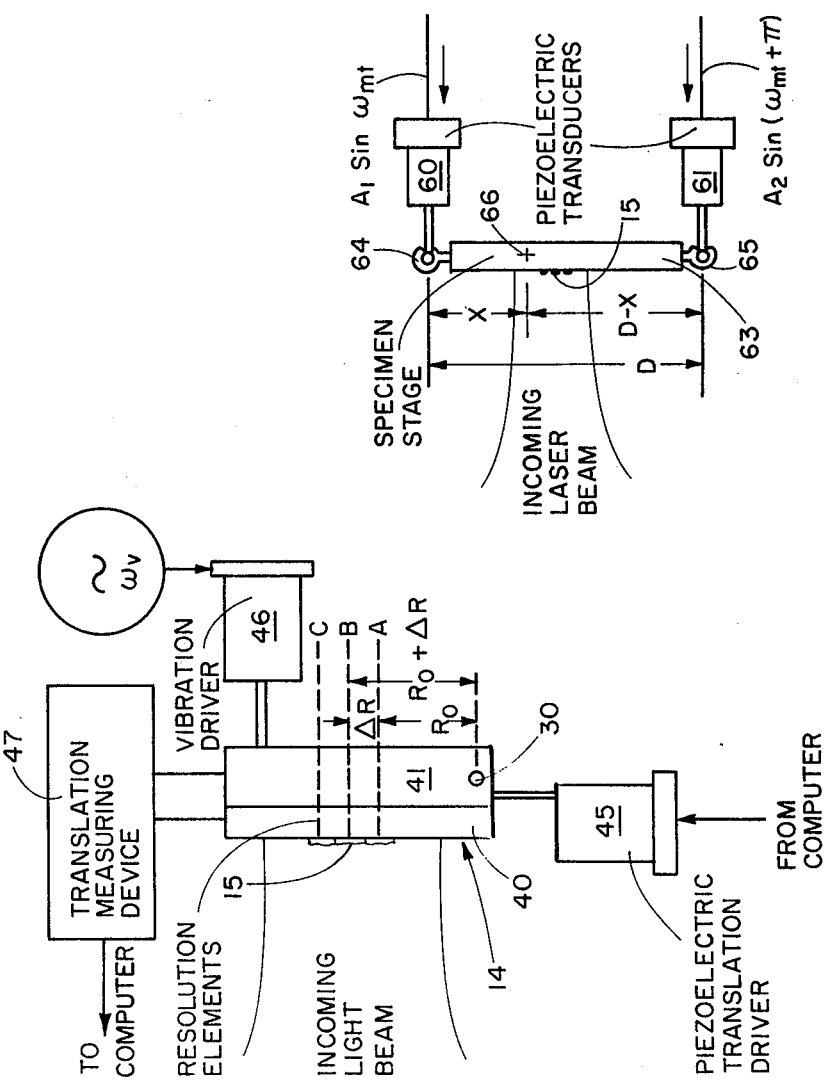
Fig. 5
Fig. 7
Fig. 4

OPTICAL HOMODYNE MICROSCOPE

The invention described herein may be manufactured and used by or for the Government of the United States of America for governmental purposes without the payment of any royalties thereon or therefor.

This invention concerns microscopic investigation of very small objects and, more particularly, means for and methods of conducting such investigations without introducing a radiation field that either destroys the sample or the media or greatly modifies the nature or speed of the process observed.

The resolution of a conventional microscope is limited to dimensions on the order of an optical wavelength of the interrogating radiation. Hence, to study very small objects such as viruses, electron microscopes with effective interrogation wavelengths in the 10–100 Å range must be used. Since the energy-per-photon of any radiant source is inversely proportional to $\lambda$, the radiation used to investigate very small objects is necessarily very energetic and dissociates or otherwise destroys the object investigated unless special steps are taken. Thus, a live virus cannot be studied, and must, in fact, be metal or plastic coated prior to interrogation by an electron microscope. In addition, use of an electron microscope requires that the specimen be viewed in a vacuum thereby placing additional constraints upon its use. Also, a large fraction of the total time involved in the use of an electron microscope is consumed in specimen preparation.

Both optical heterodyne and homodyne detection methods enable the change in frequency of a coherent optical signal to be determined to a very high degree of accuracy, i.e. frequency changes on the order of one part in $10^{10}$ are readily measurable. This sensitivity has fostered the development of doppler imaging radar systems in which analysis of doppler frequency shifts from different surface features of a distant rotating object are used to resolve or reconstruct the shape of the object with far greater precision than could be achieved using a telescope with any reasonable dimensions. In particular, the resolution achieved is much better than could theoretically be obtained using a telescope with an aperture as large as the optical radar receiver aperture.

The foregoing electron microscope deficiencies are avoided in the optical homodyne microscope (OHM) of the present invention by employing the doppler radar principle wherein optical homodyne detection is used to detect the phase modulation of optical radiation that is reflected from a vibrating or rotating body having dimensions smaller than the interrogating wavelength. By analyzing the resulting sideband spectrum, information regarding the shape of the object can be obtained.

Accordingly, it is an object of the present invention to provide an optical microscope which uses radiation of such frequencies as to allow organisms to be studied without killing them and which does not require special preparation of the sample or organism to be investigated.

Another object of this invention is to provide an optical microscope which is capable of using a variety of inspection wavelengths for which samples exhibit different absorption and reflection properties which cannot be investigated using electron microscopes.

A further object of this invention is to provide an optical microscope which is adapted to use visible or near uv radiation for inspection and quality control of optical components at a much higher resolution than is presently possible using radiation in these spectral ranges.

A further object of this invention is to provide an optical microscope which does not require the sample to be placed in a vacuum so that volatile materials may be examined without having to be coated or cooled and interactions of solid materials with arbitrary gaseous atmospheres can be studied in real time.

A still further object of this invention is to provide an optical microscope which allows the observation of physical processes which occur at the surfaces of high density data storage media to be observed in real time without introducing a radiation that either destroys the media or greatly modifies the nature or speed of the process observed.

Other objects, advantages and novel features of the present invention will become apparent from the following detailed description thereof when considered in conjunction with the accompanying drawings in which like numerals represent like parts throughout and wherein:

FIG. 1 is a schematic drawing of a conventional imaging system;

FIG. 3 is a schematic drawing of a fundamental embodiment of the invention;

FIG. 4 is an enlarged schematic view of an OHM specimen stage arrangement wherein the stage is oscillated at a frequency $\omega_v$;

FIG. 5 shows the position of the components of FIG. 4 after a selected stage movement;

FIG. 7 is a schematic drawing of an alternate arrangement for moving the pivot axis relative to the specimen in one dimension;

FIG. 11 is a schematic drawing illustrating how the various embodiments may be modified to avoid the detection of specularly reflected radiation components.

Figure 2:
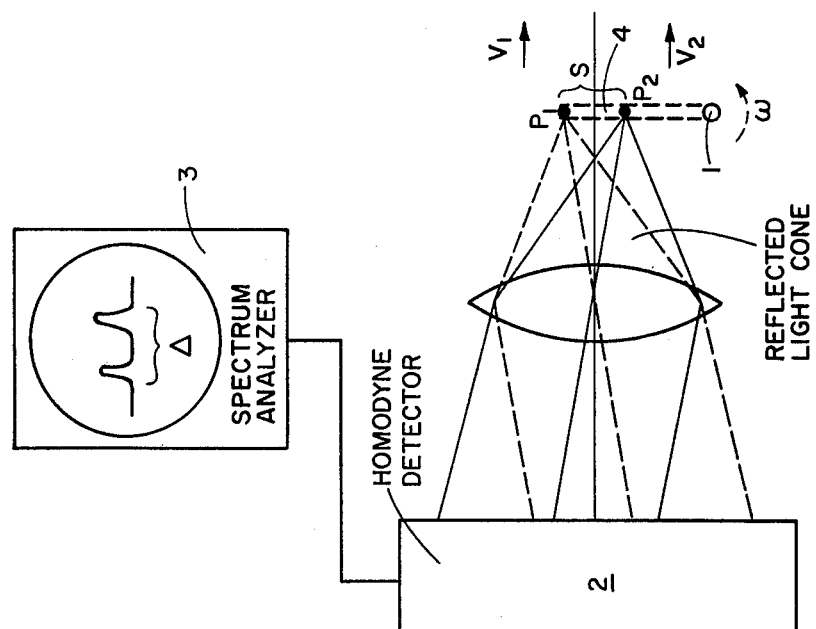
FIG. 2 is a schematic drawing of an optical homodyne imaging system explaining the basic principle of operation of the invention.

The present invention, in general, concerns a system for detecting phase modulation of optical radiation that is reflected from a vibrating or rotating body having dimensions smaller than the interrogating wavelength. A simplified form of the invention employs a conventional optical homodyne detection configuration for detecting the phase modulation of coherent radiation reflected from a moving sample or specimen. The entire specimen fits within the focal area of the system's focusing lens so that its structural characteristics are unresolved in the usual optical sense. The specimen is mounted upon a stage that can be oscillated by angular vibration about a fixed pivot at a relatively low audio frequency $\omega_v$. A fixed stage and vibrating optical system can be used where specimen damage may result from oscillation. The specimen stage is arranged so that the distance from the pivot axis to the specimen can be varied in an identifiable and controllable manner. The sizes and distances between resolution elements, i.e. elementary areas with fixed known positions on the surface of the stage, are chosen so as to be as small as is consistent with the minimum permissible signal-to-noise ratio. Radiation is scattered from all portions of the specimen, and changes in the nature of this scattered radiation which result from changes in the state-of-motion of the specimen are measured and stored. Using all stored data, the amplitude and phase of the radiation reflected from the portions of the specimen that lie within each of the resolution elements are computed. Thereafter, both one-dimensional image information and depth/reflection phase-shift information are provided as computer outputs. Two-dimensional image information is obtained by repeating the above procedure for different angular orientations of the specimen.

The optical homodyne microscope is, in a sense, the microscopic analogue of doppler imaging radar. FIG. 1 explains the operation of a conventional optical imaging system. Two stationary reflecting points $P_1$ and $P_2$ which are separated by a distance S are illuminated from the left with coherent radiation of frequency $\nu_o$. The scattered radiation is collected by a lens $L_2$ and re-imaged by a lens $L_1$. Were it not for diffraction effects at the lens apertures, resolvable images of $P_1$ and $P_2$ could be formed, no matter what the value of S. However, diffraction effects give rise to an unavoidable beam spread, $\theta_d$, in the region between lens $L_1$ and $L_2$. The magnitude of this diffractive beam spread is given by the expression, $\theta_d \geq \lambda/D$ where $\lambda$ is the wavelength of the interrogating radiation and D is the lens aperture. It is obvious from FIG. 1 that if $\theta_d$ exceeds the angle, $\theta$, subtended by S at the center of lens $L_2$, then the two parallel beams that result from radiation reflected by $P_1$ and $P_2$ cannot be distinguished and distinguishable images of $P_1$ and $P_2$ cannot be formed by lens $L_1$. Since $\theta$ is equal to S/f, this means that in order for $P_1$ and $P_2$ to be resolved in the usual optical sense $S/f \geq \lambda/D$ or $S \geq \lambda f/D$. For practically realizable optical systems $f/D \geq 1$, so that $S \geq \lambda$. Hence, in order to optically resolve the two points $P_1$ and $P_2$, the distance between them must exceed the wavelength of the incident radiation. If the separation is less than that, inspection of the image formed will not allow one to determine that two reflecting points are involved.

In the situation indicated in FIG. 2, two point reflectors separated by S again are illuminated by coherent radiation but now these points are instantaneously moving parallel to the incident radiation at velocities $V_1$ and $V_2$. In addition, a homodyne detection/spectrum analyzer arrangement provided by a detector 2 and an analyzer 3 is substituted for image forming lens $L_1$. This detection system is capable of detecting and displaying any frequency differences between the reflected radiation and the incident radiation.

When $P_1$ and $P_2$ are moving along the direction of propagation of the incident beam, the radiation reflected from these points will be doppler shifted by amounts $$\Delta\nu_1 = \frac{2V_1}{C}\nu_o \text{ and } \Delta\nu_2 = \frac{2V_2}{C}\nu_o.$$

Therefore if $V_1$ is unequal to $V_2$, two signals with frequency sepration $$\Delta = \frac{2(V_1 - V_2)\nu_o}{C} = \frac{2(V_1 - V_2)}{\lambda}$$

will appear upon the spectrum analyzer screen. If $V_1-V_2$ is large enough to allow frequency resolution of these electrical signals, it will be possible to determine from the display that there are at least two reflecting points involved, no matter what the value of S. For example, if $V_1-V_2$ is equal to 1 cm/sec and visible incident radiation is used, $\Delta \approx 40$ KHz, a value that is very easy to resolve. Furthermore, if the relative velocity of $P_1$ and $P_2$ could be directly related to their separation, S, measurement of $\Delta = 2(V_1 - V_2)/\lambda$ would allow S to be determined even if S were much less than $\lambda$. Furthermore, the measurement of the heights of the spectrum analyzer peaks would allow determination of the relative reflectivities of points $P_1$ and $P_2$. Hence, the details of an object which includes points $P_1$ and $P_2$ could be resolved with a resolution exceeding $\lambda$, even though this is not possible in the usual optical sense. A very simple technique for insuring that the relative velocity of $P_1$ and $P_2$ is a known linear function of their separation is to attach these points to a rigid, nonreflecting rod 4 that is rotated about fixed point 1 at a known angular velocity, $\omega$. With this arrangement, $V_1 - V_2$ is equal to $\omega S$ so that $S = \lambda\Delta/2\omega$. The above discussion can be generalized to allow resolution of an arbitrary number of reflecting points on the surface of a rotating rigid body. The mathematical formulation of this generalization, for the case of large microscopic rotating bodies at great distances from the observer, constitutes the well developed theory of doppler imaging radar. Applications of such radars allow the shapes of distant rotating objects, such as satellites or features on the surface of the moon, to be resolved even though the total dimensions of these objects are much smaller than could be resolved by an optically perfect telescope with aperture size equal to that of the radar receiving lens.

The basic principle involved in the operation of the OHM is the same as that involved in doppler imaging radar. Of central importance for operation of both systems is the fact that even though an object cannot be resolved in the usual optical sense, it is generally possible to infer its shape and optical reflectivity characteristics from the phase and frequency modulations it produces when coherent radiation is reflected from it while it is in one or a series of well defined states of motion. In the case of imaging radar, the motion involved is the rotation of a large distant object, so that each element on the object's surface moves through a distance equal to many wavelengths of the incident coherent radiation during the period of interrogation. In this case, resolvable doppler shifts are produced by adjacent resolution cells on the object and something akin to the spectrum analyzer of FIG. 2 can be used to construct a doppler image, after a single observation. In the case of the OHM, however, the total extent of the object is in general smaller than an interrogating wavelength, the imposed motion of the object is periodic, e.g. vibratory, and the distance moved by the reflecting points on the object are much smaller than a wavelength. Under these circumstances, a resolvable doppler frequency shift is not produced in the reflected coherent radiation but, instead, a phase modulation is produced with fundamental frequency equal to the vibration frequency of the object. All reflecting points on the object contribute to this phase-modulated return, with the contribution from each point being determined by its specific reflectivity characteristics. It is, therefore, not possible to reconstruct an image after a single measurement, but instead a series of measurements must be made in which the state-of-motion, and therefore the phase-modulation contribution, of each reflecting element is somewhat different from measurement-to-measurement. As is explained in greater detail infra, this multiple measurement procedure, if properly carried out, can result in an unambiguous determination of the amplitude and phase of the radiation reflected from each individual reflecting element. Hence, in analogy to the case of doppler imaging illustrated in FIG. 2, with the OHM an "image" of a submicroscopic object is constructed from a knowledge of the imposed motions of its reflecting elements and the known relationship of these motions to the relative spacial positions of the elements. In contrast to doppler imaging radar, a series of measurements is made with different, imposed states of motion. This allows unambiguous image information to be obtained, even though all dimensions and displacements involved are much smaller than an optical wavelength.

FIG. 3 schematically illustrates one embodiment of the invention that includes a C. W. gas laser 11 having a beam output 12 at wavelength $\lambda$ which is substantially focused by a lens 13 onto a specimen stage 14, only generally shown, that has a specimen 15 mounted thereon. Beam 12 is divided by a beam splitter 18 into a reference component 19 that is directed to a retroreflecting mirror 20 and component 21 which impinges on stage 14 and specimen 15. The path of component 19 is adjusted by a piezoelectric transducer 23 on which mirror 20 is mounted, with transducer 23 controlled by a transducer driver 24 which is powered and controlled by a computer 25. Stage 14 necessarily is subject to repetitive motion such as rotary vibration about a pivot axis 30 on a bracket 31 by a driver 32. Radiation reflected from specimen 15 is directed by beam splitter 18 to a homodyne detector 35 which also receives component 19. Unwanted frequency components of the output of detector 35 are filtered out by an audio filter 36 having a center frequency $\omega_v$ which is the preferred oscillation frequency that stage 14 is driven at. The amplitude of the $\omega_v$ signal component from filter 36 is detected by an audio amplitude detector 38 and fed to computer 25. FIGS. 4 and 5 are enlargements of the stage 14 configuration and show that the stage comprises a plate 40 which is slidably mounted on a base 41 that is rotatable about pivot axis 30. Base 41, and therefore pivot axis 30, are varied in planar position with respect to specimen 15 by a piezoelectric translation driver 45 which is controlled by computer 25 and is oscillated rotationally by a vibration driver 46 at frequency $\omega_v$. Information on the instantaneous planar positions of any fixed point on plate 40 relative to pivot axis 30 are read by a translation measuring device 47 and fed to the computer. A coordinate system which includes the surface of specimen 15 is defined by a plurality of resolution elements A, B, C, etc. having known planar positions on the surface of plate 40. FIG. 5 illustrates the condition where base 41 has been translated a distance $\Delta R$ from the initial position shown in FIG. 4. The distance between resolution elements is uniform and corresponds to the distance between successive translation steps.

Figures 6, 8:
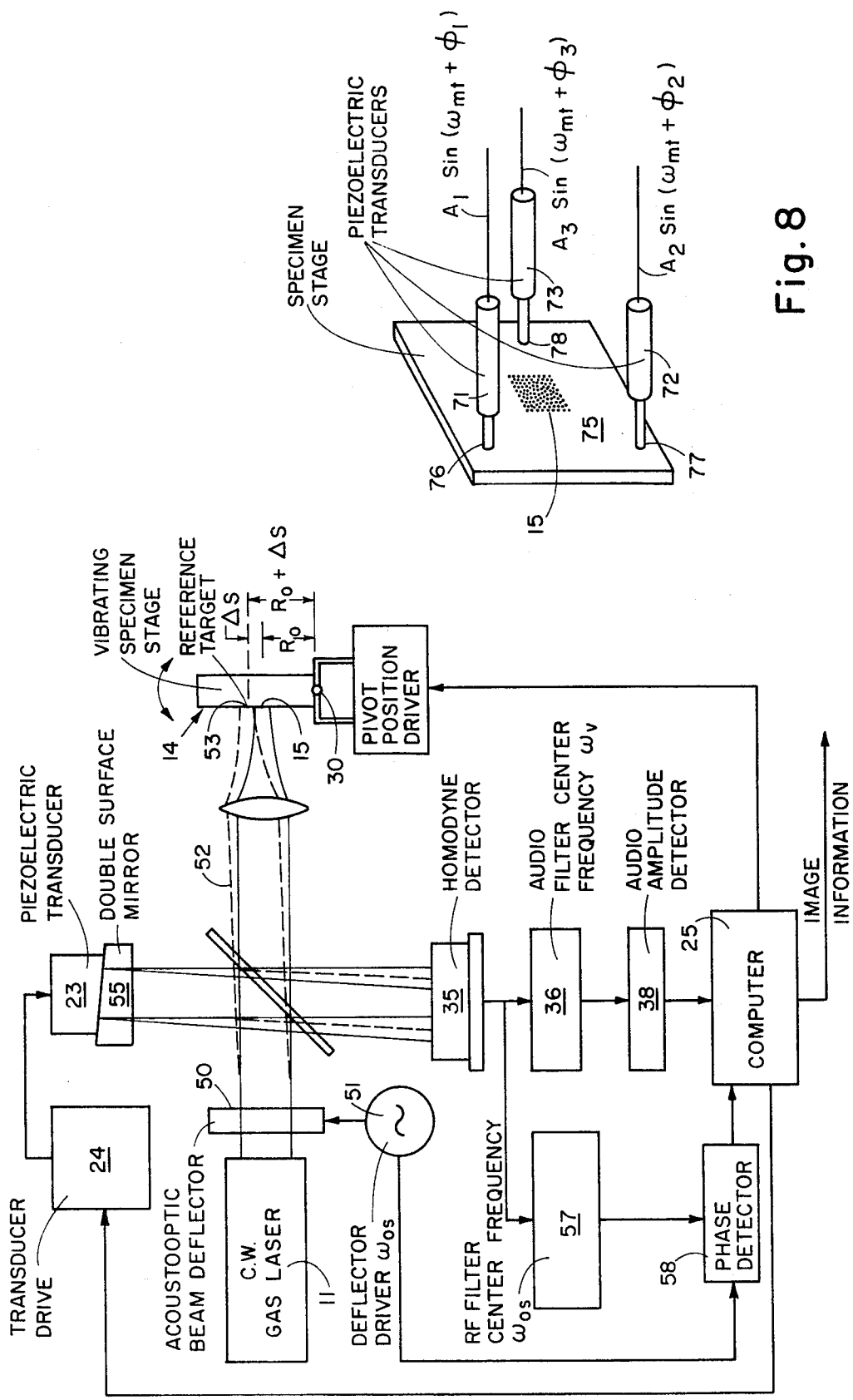
FIG. 6 is a schematic drawing of an alternate embodiment of the invention which utilizes heterodyne detection for specimen stage and retro-reflecting mirror registration.
FIG. 8 is a schematic drawing of another arrangement for positioning and orienting the specimen with respect to the pivot in two dimensions.

FIG. 6 illustrates an embodiment of the invention that utilizes heterodyne detection to obtain precise measurement of the specimen stage and retroreflecting mirror positions. This embodiment includes a weak acousto-optic beam deflector 50 driven by a deflector driver 51 at a frequency $\omega_{os}$ to provide an angularly deflected and frequency secondary reference beam 52 of amplitude $E_r$. This beam is used to interrogate a reference spot indicated at 53 on specimen stage 14 which is displaced a small but resolvable distance $\Delta s$ from specimen 15. An appropriately wedged retroreflecting mirror 55 is mounted on transducer 23 and aligned in such a manner that reference beam 52 reflected from reference spot 53 is optically heterodyned with the primary local oscillator reference beam 19 to provide an output signal of a desired form. Also added in this embodiment are an RF filter 57 having a center frequency $\omega_{os}$ to separate the homodyne signal resulting from detection of beam component 21 from the heterodyne signal resulting from detection of secondary reference beam 52 and a phase detector 58 to extract the quiescent phase and phase modulation index of the secondary reference beam heterodyne signal. For this process, output from deflector driver 51 is used for phase reference.

FIG. 7 illustrates an alternate arrangement for varying the distance from the pivot axis to the specimen wherein a pair of transducers 60 and 61 suitably mounted in a manner not shown and pivotally supporting and connected to a specimen stage 63 as indicated at 64 and 65 are operated so as to angularly oscillate stage 63 about a pivot axis 66. The excursions of transducers 60 and 61 are adjusted so that the distance x between transducer connection point 64 and pivot axis 66 can be continuously changed by adjusting the absolute and relative amplitudes of the maximum transducer excursions. FIG. 8 shows another arrangement for effecting specimen motion which includes triangularly spaced piezoelectric transducers 71–73 which are suitably mounted in a manner not shown at one end and connected to and support a specimen stage 75 at points 76–78 at the opposite end. By proper operation of the transducers, the relative excursions of points 76–78 on stage 75 can be accurately controlled during vibratory motion. This arrangement allows both the angular orientation and the position of pivot to be controlled at will.

Figure 10:
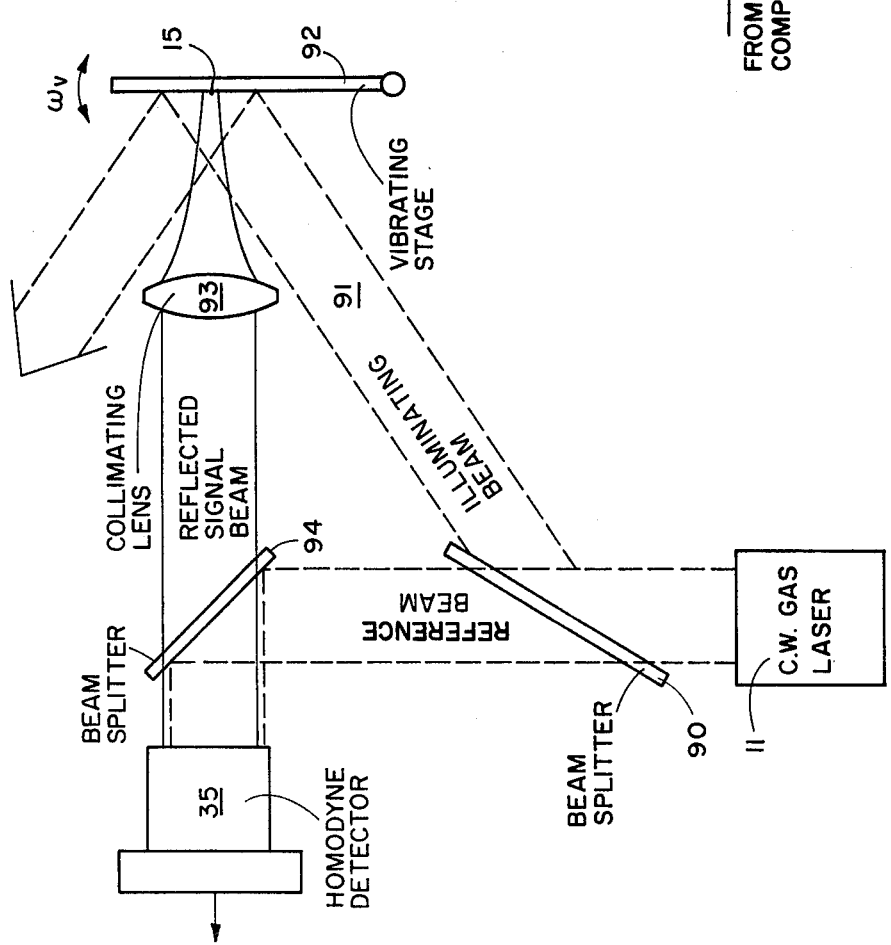
FIG. 10 is a schematic drawing of a further embodiment of the invention wherein the illuminating beam is not at normal incidence with respect to the specimen stage.
Figure 9:
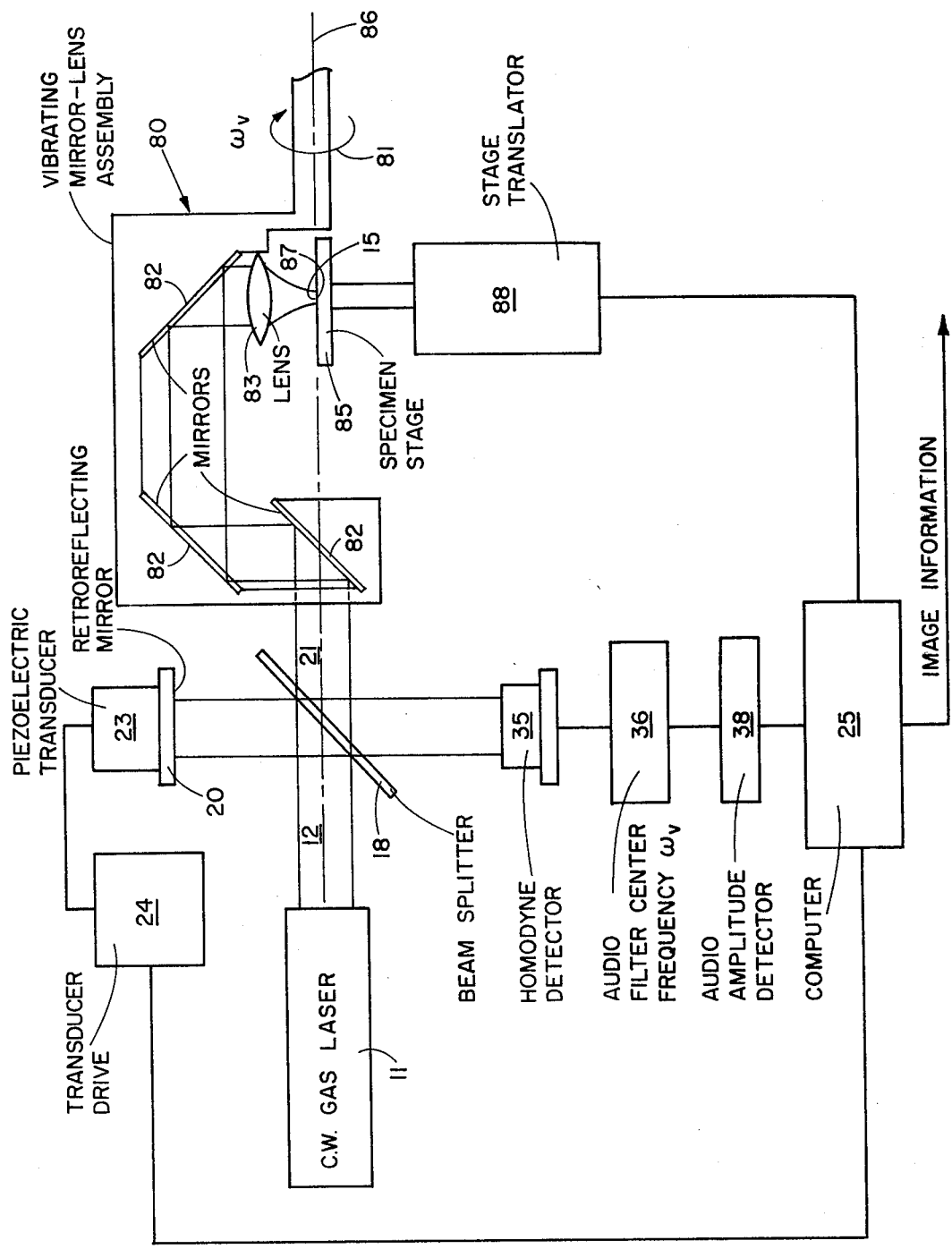
FIG. 9 is a schematic drawing of another embodiment of the invention wherein the specimen stage is not subject to vibratory motion.

FIG. 9 illustrates an embodiment in which the direction of the impinging focused laser beam is vibrated by a vibrating mirror-lens assembly 80 in lieu of vibrating the specimen for instances where mechanical simplicity is desired. Mirror-lens assembly 80 may be oscillated by conventional means, not shown, at a frequency $\omega_v$ as indicated at 81. By means of a plurality of mirrors 82 and focusing lens 83, mirror-lens assembly 80 brings laser beam component 21 to a focus on the surface of a specimen stage 85. The rotation axis 86 of mirror-lens assembly 80 lies on the surface of specimen stage 85, within the focal region 87 of lens 83. The position of specimen 15 on the surface of specimen stage 85 relative to rotation axis 86 is controlled and varied by a mechanical translator 88, which is in turn controlled by computer 25. Specimen 15 remains entirely within focal region 87 during this translation process. FIG. 10 shows an embodiment in which the interrogating beam impinges on the specimen in a direction other than normal to the specimen stage surface to avoid detection of specularly reflected radiation components. A beam splitter 90 directs a beam component 91 toward a vibrating stage 92 at such an angle as to permit only non-specular reflections from specimen 15 to be achieved at a collimating lens 93 and directed to detector 35. An additional beam splitter 94 is required to direct beam component 21 to the detector. In FIG. 11 detection of the specularly reflected radiation component is avoided by forming a collimated illumination beam 96 through use of a pair of focusing lenses 97 and 98 and a small pickoff mirror 99 positioned at their common focal point. In this arrangement, all radiation that is specularly reflected from stage 14 is refocused upon pickoff mirror 99 and, therefore, never reaches detector 35. On the other hand, radiation that is diffusely reflection from specimen 15 and then captured by lens 98 is collimated between lens 98 and a beam splitter 100, and all this radiation therefore reaches detector 35, except for the very small fraction that is intercepted by pickoff mirror 99. A portion of laser output beam 12 is split off by a second beam splitter 103 and directed by a mirror 104 and beam splitter 100 so as to serve as a reference beam at the surface of detector 35.

Operation of the invention can best be described with reference to the fundamental system and specimen stage embodiments of FIGS. 3-5. In preparation for one-dimensional image construction, specimen 15 is placed over a one-dimensional resolution element grid on the surface of translatable, rotatable plate 40 in FIG. 4. The specimen is illuminated by coherent laser beam 21 and the reflected radiation is collected by lens 13 and recombined with a sample of the transmitted laser beam, 19, at beam splitter 18. The combined beam is then allowed to strike square law homodyne detector 35. The entire specimen fits inside the focal area of lens 13 so that its structural characteristics are unresolved in the usual optical sense. The stage on which the specimen is mounted is angularly vibrated at a relatively low audio frequency, $\omega_v$, about stage pivot axis 30 so that a homodyne signal with frequency components that are multiples of $\omega_v$ appears at the output of detector 35. All frequency components except the fundamental, at frequency $\omega_v$, are then removed from this homodyne signal by audio filter 36 and the desired $\omega_v$ frequency component is amplified by audio amplifier 38. The magnitude of this component is supplied as input to computer 25.

In order to construct a one-dimensional image the following sequence of operations is carried out, under control of computer 25:

(1) with the pivot axis a distance $R_o$ from the first resolution element, the amplitude of the $\omega_v$ frequency component of the homodyne receiver output is measured and the result stored;

(2) the distance between beam splitter 18 and mirror 20 is increased by $\lambda/8$ by applying an appropriate voltage to piezoelectric transducer 23;

(3) the measurement defined in step 1 is repeated, the results are stored, and mirror 20 is returned to its original position;

(4) the distance between pivot axis 30 and all resolution elements is increased by the distance between adjacent elements, $\Delta R$;

(5) steps 1-4 are repeated N times where N is the number of resolution elements;

(6) from all of the stored data, the amplitude, $E_\eta$, and phase, $\alpha_\eta$, of the radiation reflected from those portions of specimen 15 lying within each of the N resolution elements is computed; and (7) both one-dimensional image information, i.e. the $E_\eta$'s, and depth/phase-shift information, i.e. the $\alpha_\eta$'s, are provided as computer output.

Two dimensional image information can be obtained by repeating the above procedure for different angular orientations of the specimen relative to the rotation axis.

To understand how the N measurements described above allow computer 25 to construct a one-dimensional image of specimen 15, it is necessary to consider, in detail, the nature of the homodyne signal at the output of detector 35 during the $p^{th}$ measurement of the sequence. Prior to step (2), the amplitude of this audio frequency electrical signal is given, in mathematical terms, by the expression:

$$A_p = K \sum_{\eta=1}^{N} E_o E_\eta \cos\left[\alpha_\eta + \frac{4\pi}{\lambda} R_\eta^p \sin(\theta_m \sin \omega_v t)\right] \quad (1)$$

where:

K = constant;
N = number of resolution elements
$E_o$ = constant amplitude of reference beam 19 at the detector surface;
$E_\eta$ = total amplitude of the radiation reflected by the $\eta$'s resolution element on the specimen;
$\alpha_\eta$ = quiescent difference in phase at the detector surface of reference beam 19 and the radiation reflected from the $\eta$'s resolution element;
$R_\eta^p$ = distance from the pivot axis to the $\eta$'s resolution element during the $p^{th}$ measurements; and
$\theta_m$ = maximum angular excursion of vibrating specimen stage 14.

Straightforward Fourier expansion of the right side of equation (1) yields frequency components at all harmonics of the mirror vibration frequency. The amplitude of the component at $\omega_v$, which passes through narrow band audio filter 36 during the $p^{th}$ measurement, is given, to a high degree of accuracy, by:

$$A_p^c(\omega_v) = \sum_{\eta=1}^{N} E_\eta' \cos \alpha_\eta J_1(X_\eta^p) \quad (2)$$

where $J_1(X_\eta^p)$ is the first order Bessels function; with argument $X_\eta^p$ and $E_\eta' = K E_o E_\eta$:

$$X_\eta^p = \frac{8\pi}{\lambda} [R_o + (\eta - p) \Delta R] J_1(\theta_m) \quad (3)$$

After the foregoing measurement sequence has been carried out N times and N values of $A_p^c(\omega_v)$ have been measured, N equations of the form indicated in (2) are provided for the N unknowns, $E_\eta' \cos \alpha_\eta$. These equations can be solved to yield the $E_\eta' \cos \alpha_\eta$'s provided that the determinant of the coefficients $|J_1(X_\eta^p)|$ is non-vanishing. It can be shown that this is in general the case.

At each translation position of the specimen stage, i.e. for each value of index p, a measurement of the $\omega_v$ frequency component of the homodyne detector output is made with the distance between beam splitter 18 and mirror 20 increased by $\lambda/8$ (see steps 2 and 3 above). This additional optical path adds a transit phase of $\pi/2$ to reference beam 19 and therefore increases the values of all $\alpha_\eta$'s by $\pi/2$. Hence, a set of simultaneous equations of the form:

$$A_p^s(\omega_v) = \sum_{\eta=1}^{N} E_\eta' \sin \alpha_\eta J_1(X_\eta^p) \qquad (4)$$

is provided. Solution of this set of equations yields the values of $E_\eta' \sin \alpha_\eta$. By combining these results with the $E_\eta' \cos \alpha_\eta$ results, separate values of $E_\eta'$ and $\alpha_\eta$ are obtained. It should be noted that this capability to unambiguously separate amplitude from phase information is of critical importance to OHM operations.

In order to carry out the calculations indicated above for construction of a one-dimensional image, computer 25 must be supplied with values of $R_o$, $\Delta R$, $\theta_m$, and N as initial inputs. The values of $R_o$ are chosen in such as way as to make the determinant of the J matrix, defined below, as large as possible. This choice minimizes the calculational difficulties involved in inverting the J matrix. $\theta_m$, on the other hand, is made as large as possible consistent with specimen 15 remaining in the focal saddle of lens 13 during the entire period of oscillation of stage 14. Reasonable values of these parameters are 0.5 $\mu$m. $\leq R_o \leq 10$ $\mu$m and $2° \leq \theta_m \leq 10°$.

The distance between resolution elements, $\Delta R$, is arbitrarily chosen to be as small as is consistent with the minimum permissible signal-to-noise ratio. Actually, radiation is scattered from all portions of the specimen and changes in the nature of this scattered radiation which result from changes in the state-of-motion of the specimen are what is measured. The changes in the state-of-motion from measurement to measurement are determined by, $R_\eta^p - R_\eta^{0-1} = \Delta R$. If the changes in state-of-motion are too small, i.e. if $\Delta R$ is too small, the changes in scattered radiation are too slight to be measurable. If, on the other hand, they are too large, the quantization of the scattering characteristics is too gross, and poor spacial resolution results. Therefore, $\Delta R$ is chosen as small as possible while still maintaining a measurable change in reflected radiation as the pivot point is moved by $\Delta R$. The exact value of $\Delta R$, thus depends upon specimen reflectivity, integration time, and radiation density at the specimen plane. Values of $\Delta R$ ranging from $\lambda/10$ to $\lambda/100$ are reasonable. Once $\Delta R$ has been chosen N is given by the maximum transverse dimension of the specimen divided by $\Delta R$.

The first mathematical step in the construction of an image is to compute $N^2$ values of $X_\eta^p$ using equation (3). $N^2$ values of $J_1(X_\eta^p)$ are then calculated and a "J" matrix is constructed where:

$$J = \begin{bmatrix} J_1(X_1^1) & J_1(X_1^2) & \cdots & J_1(X_1^N) \\ J_1(X_2^1) & J_1(X_2^2) & \cdots & J_1(X_2^N) \\ \vdots & \vdots & & \vdots \\ J_1(X_N^1) & J_1(X_N^2) & \cdots & J_1(X_N^N) \end{bmatrix} \qquad (5)$$

The next, and most difficult, mathematical step is to invert the J matrix yield $J^{-1}$. It should be noted in this connection that no measured quantities are involved in the J matrix and as long as a fixed measurement procedure is followed J remains the same no matter what the nature of the sample. Hence, the task of constructing and inverting J need only be performed once which is a great advantage since it allows $J^{-1}$ to be calculated a priori using a sophisticated high speed computer. Once this is done and the resulting matrix elements are permanently placed in the memory of computer 25, matrix multiplication is the only matrix operation involved in image construction. Since this is a very simple mathematical process, it can be effectively carried out even if computer 25 is quite unsophisticated and inexpensive.

After the $J^{-1}$ matrix has been determined and its elements stored in the memory of computer 25, a series of homodyne signal measurements are made as described herein. For each measurement, values of $A_p^c(\omega_v)$ and $A_p^s(\omega_v)$ are obtained and, after N measurements, two column vectors of the following form are constructed:

$$A^c = \begin{bmatrix} A_1^c(\omega_v) \\ \vdots \\ A_N^c(\omega_v) \end{bmatrix} \text{ and } A^s = \begin{bmatrix} A^s(\omega_v) \\ \vdots \\ A_N^s(\omega_v) \end{bmatrix} \qquad (6)$$

Matrix multiplication of these column vectors by $J^{-1}$ yields:

$$J^{-1} A^c = \begin{bmatrix} E_1' \cos \alpha_1 \\ E_2' \cos \alpha_2 \\ \vdots \\ E_N' \cos \alpha_N \end{bmatrix} \equiv E^c ; \quad J^{-1} A^s = \begin{bmatrix} E_1' \sin \alpha^1 \\ E_2' \sin \alpha_2 \\ \vdots \\ E_N' \sin \alpha_N \end{bmatrix} \equiv E^s \qquad (7)$$

The final mathematical step is to calculate the $(E_\eta')^2$'s and $\alpha_\eta$'s from the elements of column vectors $E^c$ and $E^s$ using the relationships:

$$E_\eta'^2 = (E_\eta' \cos \alpha_\eta)^2 + (E_\eta' \sin \alpha_\eta)^2 = (E_\eta^c)^2 + (E_\eta^s)^2 \qquad (8)$$

$$\tan \alpha_\eta = \frac{E_\eta' \sin \alpha_\eta}{E_\eta' \cos \alpha_\eta} = \frac{E_\eta^s}{E_\eta^c} \qquad (9)$$

The construction of a two transverse dimensions image can be achieved by proceeding along exactly the same lines as the above. In the 2D case the specimen stage is pivoted about two orthogonal axes simultaneously so that only one pivot point on the stage is at rest during each measurement, rather than a whole line of points.

This process is repeated for a square array of different pivot points and N measurements of $A_p^c(\omega_v)$ and $A_p^s(\omega_v)$ are made. An N X N J matrix is constructed with elements whose values depend upon the distances from the N pivot points to the N resolution elements on the specimen. This matrix is inverted and multiplied by column vectors of the form indicated in equation (6) to yield the $E^c$ and $E^s$ vectors of equation (7).

An alternative technique for constructing images in two transverse dimensions is to construct several one-dimensional images with the pivot axis at different angular orientations with respect to the specimen. Even though image features along directions parallel to the individual pivot axes are averaged when this procedure is followed, a good fidelity two-dimenisonal image can be gleaned provided that a sufficient number of one-dimensional image constructions are made. It should be noted that it is straightforward to overdetermine the matrix algebra problem involved in image construction by making more experimental measurements than there are resolution elements. This procedure might be advisable in some instances since it would allow better accuracy to be achieved at the expense of added data-gathering time and mathematical complexity.

The final outputs from the system defined herein and indicated schematically in FIG. 3 are calculated values of $E_\eta'^2$ and $\alpha_\eta$ for all N resolution elements on the specimen. Since $E_\eta'^2$ is proportional to the reflectivity of the $\eta^{th}$ element and $\alpha_\eta$ is proportional to the perpendicular distance from the $\eta^{th}$ element to a reference plane parallel to the surface of the specimen stage, these outputs can be converted to a visual display using any one of a number of computer-graphic devices, or equivalently, using an x-y retention scope with spot intensity proportional to $E_\eta'^2$.

The resolution of the OHM is related to the accuracy of measurement of the homodyne signal amplitudes and the precision achieved in the various mechanical movements and the indexing. In regard to measuring the homodyne signal amplitudes, a simple example has been analyzed in which a linear dot pattern is imaged with a $\lambda/50$ resolution using an optical wavelength of $\lambda = 5000$ A. The results of this analysis indicated that if the reflectivity contrast of the pattern is 4%, the optical system transmission is 20%, and an audio frequency bandwidth of 1 Hz is used a total optical power on the sample stage on the order of 1mw should afford good image construction. Power levels of this magnitude are readily obtainable from commercially available gas laser systems. In the example used, the initial distance from the pivot axis to the first resolution element was $R_o = 4\lambda (=2\mu)$ and the maximum angular excursion of the vibrating specimen stage was $\theta_m = 4.6°$. In the OHM embodiments of FIGS. 3 and 6 in which the interrogating laser beam propagates normal, or nearly normal, to the plane of the specimen stage, use of a highly reflective specimen stage could result in a large specular radiant component being reflected into the homodyne receiver system. Under certain circumstances the homodyne signal resulting from this unwanted component could swamp the desired image signal. A simple technique for avoiding this condition is to use an antireflection coated transmissive optical flat as a specimen stage. Such flats are routinely manufactured with specular reflectivities of less than 0.1% and it is believed that considerably lower reflectivities could be achieved with moderate effort. With such a low reflectivity surface, the spurious specularly reflected signal will certainly not swamp the desired signal in the sense of saturating the detector. In homodyne detection, such as is used in the OHM, the noise level is determined by the local oscillator power striking the detector and is almost independent of signal level. Therefore, unless detector saturation occurs, the magnitude of a relatively large signal can be measured with about the same absolute accuracy as the magnitude of a much smaller signal. Hence, even if a constant specularly reflected spurious signal much larger than the desired signal is present, it generally has little or no effect upon OHM operation. On the other hand, any spacial variations in the specularly reflected signal could be substracted out by measuring this signal prior to introducing the sample, i.e. by "imaging" the specimen stage.

It should be noted that the possibility of using a reflective specimen stage in the OHM embodiments shown and described, thereby purposely producing a large specular or diffuse reflection component from the stages, provides a transmissive type measurement capability in which the specimen is displayed as a dark pattern on a light background. This is equivalent to the use of an electron microscope in the transmissive, rather than reflective, mode. Furthermore, since the OHM supplies as output both the amplitude and the phase characteristics of the radiation reflected from the specimen, reflective stage OHM operation automatically supplies "phase contrast" type information. The coherent light beam that illuminates the OHM specimen need not be focused or impinge in a direction that is normal to the specimen stage surface. Hence, if desired, it is possible to avoid the detection of specularly reflected radiation components by using an OHM embodiment like the one shown in FIG. 10. It is also possible to avoid the detection of the specularly reflected radiation component by using an illumination beam that is normal to the stage and rejecting a very small percentage of the desired, Rayleigh scattered optical component. An embodiment illustrating this technique is shown in FIG. 11.

It should be emphasized that diffuse, i.e. Rayleigh, optical scattering centers on the surface of the specimen stage are what the OHM is intended to image. Therefore, dust particles and stage structural imperfections constitute spurious "specimens" and must be avoided. This is the case with any microscopic system. In the case of the OHM, the focal spot diameter is equivalent to the field-of-view of an ordinary optical microscope.

In order to utilize the OHM, 1) retroreflecting mirror 20 of FIG. 3 is moved by precisely $\lambda/8$ and then returned to its initial position, 2) the distance from pivot axis 30 to the various resolution elements is varied by a small fraction of an optical wavelength, and 3) the relative position of the pivot axis and the resolution elements must be registered with high accuracy. Slow, precise movement of a mirror stage over distances of an optical wavelength or less is relatively easy to accomplish using piezoelectric transducers. Motion control of this kind can be found in applications of servocontrol of laser and Fabry-Perot interferometer cavity spacing. The essential effort does not reside in producing or controlling the desired motion as much as it does in measuring it.

An elaboration of the basic OHM of FIG. 3, which utilizes heterodyne detection for precise measurement of the sample stage and reference beam retroreflecting mirror positions, is shown in FIG. 6. In the arrangement of FIG. 6, a weak acousto-optic beam deflector 50 is used to provide an angularly-deflected and frequency-offset secondary reference beam 52 of amplitude $E_r$. This beam is used to interrogate a reference spot 53 on the specimen holder that is placed a small but resolvable distance, $\Delta S$, from the specimen. By using an appropriately wedged retroreflecting mirror 55, the system is aligned in such a way that the reference beam reflected from the reference spot is optically heterodyned with the primary reference beam 19 thus providing an output signal of the form:

$$I_{het} = KE_oE_r \cos[\omega_{os}t + \alpha_T + 4\pi/\lambda R_r \sin(\theta_m \sin \omega_v t)] \qquad (10)$$

where $\omega_{os}$ is the offset frequency between the primary beam and the reference beam, $\alpha_T$ is the transit phase shift of the reference beam, and $R_r$ is the distance from the pivot axis to the reference spot. By measuring the average phase and phase modulation index of this signal at frequency $\omega_v$, $\alpha_T$ and $R_r$ can be measured and controlled. Since the secondary reference beam and primary beam traverse essentially the same optical path, and since $R_r = R_o + \Delta S$, this procedure allows the $\alpha_\eta$'s and the distances from the pivot axis to the various resolution elements to be accurately varied and reset.

In the OHM embodiments of FIGS. 3 and 6 and specimen stage details of FIGS. 4 and 5, the position of the specimen remains fixed while the pivot axis is moved laterally relative to the specimen during the image construction sequence. There are many ways to accomplish this such as using a sliding contact between the specimen stage and an angularly vibrating plate. An alternative technique for positioning the pivot axis in one dimension which does not involve the use of sliding contacts, is indicated in the specimen stage embodiment of FIG. 7.

In the embodiment of FIG. 7, the maximum excursion of mechanical transducers 60 and 61 are adjusted so that:

$$A_1 = X\theta_m \text{ and } A_2 = (D-X)\theta_m \qquad (11)$$

where $\theta_m$ is the constant maximum angular excursion of the stage, D is the distance between the transducer contact points, and X is the distance from the pivot axis to the contact point of transducer 60. It is apparent from FIG. 7 that X, and therefore the distance from the pivot axis to the specimen, can be chosen at will by choosing $A_1$ and $A_2$ in conformance with equation (11). Indexing is straightforward since the motion of piezoelectric as well as other types of mechanical transducers can be easily calibrated to an accuracy of a small fraction of an optical wavelength.

A generalization of the specimen stage embodiment of FIG. 7, which allows control of both the position and the orientation of the pivot axis, is indicated in FIG. 8. By properly adjusting the maximum excursion amplitudes $A_1$, $A_2$, and $A_3$, the phases $\phi_1$, $\phi_2$, and $\phi_3$ of vibratory mechanical transducers 71–73, the relative excursions of points 76, 77, and 78 on the specimen stage can be accurately controlled during vibratory motion. Since the positions of three non-collinear points on a rigid body completely define the orientation of the body, this arrangement will allow both the angular orientation and the position of the pivot axis to be controlled at will.

In the OHM embodiments indicated schematically in FIGS. 3–6, the specimen is angularly vibrated at a low audio frequency during image construction. Conventional piezoelectric and audio equipment are easily capable of providing the 5°–10° vibration amplitude required both for the sliding contact specimen stage arrangement of FIGS. 4 and 5 and for the variable drive transducer arrangement of FIGS. 7 and 8. Assuming the practical values of pivot axis-to-specimen distance=3 $\mu$m, specimen stage vibration frequency=100 Hz, and maximum angular excursion=5°, the maximum acceleration experienced by the specimen is $10^{-2}$ g's. Therefore, use of a vibration stage would certainly not be expected to damage most specimens.

Even though a vibrating specimen stage is unlikely to produce specimen damage, the OHM embodiment of FIG. 9 in which the specimen stage is not vibrated may for some purposes be the preferred form of the invention, since the vibration and translation motions can be completely decoupled. This arrangement utilizes an angularly vibrating mirror lens assembly which gives rise to a focused interrogating light beam with a direction of incidence that vibrates about a fixed axis that lies within both its focal region and the surface of the specimen stage. Hence, in this embodiment the specimen stage remains stationary while the direction of the interrogating radiation vibrates. This is equivalent, as far as homodyne detection is concerned, to vibration of the specimen stage with a fixed interrogating light beam. Therefore, the arrangement of FIG. 9 is optically equivalent to that of FIG. 3. In particular, the position monitoring technique illustrated in FIG. 6 is equally applicable for use in conjunction with the arrangement of FIG. 9.

In the OHM embodiments indicated in FIGS. 3–11, simple harmonic angular vibration of the sample stage or mirror-lens assembly is assumed for ease of explanation and/or mathematical analysis. It should be pointed out, however, that more general modes of motion are possible and, in fact, might be preferable in some cases. The only essential requirements on the imposed state of motion are; (1) it must be completely characterized, and (2) the degree of phase modulation that it imparts to coherent radiation scattered from a single point scatterer on the sample stage surface must be unambiguously relatable to the position of the scatterer on the stage.

There is thus provided an optical homodyne microscope that is capable of doing most or all of the things that an electron microscope can do using relatively "soft" optical frequency radiation. The OHM need not employ an evacuated examination chamber, and no special preparation of the sample is required. These and other features of the OHM make it very attractive for a number of military and civilian applications. Some of these applications exploit the fact that the relatively long wavelength of the OHM allows organisms to be studied without killing them. This obviously has far reaching consequences for virology, bacteriology, and other biological fields. Since damage as a result of inspection is a serious problem for microminiature, delicate electrical and optical circuit elements, use of the OHM could eliminate this problem. The possibility of using a variety of inspection wavelengths for which the sample exhibits different absorption and reflection properties lends a great deal of versatility—which is not available with electron microscopes. The OHM also eliminates the necessity for adding disabling coatings to operational components, thus allowing degradation occurring during usage to be observed directly, in real time.

The OHM also allows the physical processes which occur at the surface of high density data storage media to be observed in real time without introducing a radiation field that either destroys the media or greatly modifies the nature or speed of the processes observed. Moreover, it is obvious that if the OHM concept can be used to non-destructively inspect high density data storage media on a submicroscopic basis, it can also be used to read out certain forms of high density stored data. In addition, the fact that the OHM does not require the sample to be placed in a vacuum allows volatile materials to be examined without coating or cooling. Thus, interactions of solid and liquid materials with arbitrary gaseous atmospheres can be studied in real time. In a variety of space optics programs where short wavelength U.V. radiation is employed, inspection and quality control of the optical components used for U.V. radiation requires much higher resolution that is needed for the high precision I.R. optical components developed in the past and, for the most part, conventional testing techniques are much too crude. The OHM technique is capable of supplying the requisite resolution.

Obviously many modifications and variations of the invention are possible in the light of the foregoing teachings. For example, the free space optical paths and in some cases the lenses in the embodiments of FIGS. 3, 6, 9 and 10 can be replaced by fiber optics and vibratory or oscillatory motion of the specimen interrogating beam can be introduced via the fiber optics.

What is claimed is:

1. Apparatus for determining the submicroscopic surface characteristics of an object which is mounted on a stage with the face to be examined exposed comprising:

means for subjecting said stage to a series of different states of motion;

means for illuminating the exposed areas of said object with coherent monochromatic radiation of known amplitude and frequency, said states of motion causing said radiation to be reflected and scattered from said object in a multiplicity of different frequency components with the amplitude and phase of each instantaneous overall component determined by the amplitudes and phases of components scattered from individual points on said surface, the scattered radiation contributions of amplitude and phase from said individual points being representative of the at rest radiation scattered from each point and the effect of said states of motion thereon; and means for measuring and recording the amplitude and phase of selected ones of said different overall frequency components for each different state of motion so that an image of said object may be constructed.

2. The apparatus as defined in claim 1 wherein said means for subjecting said stage to motion include means for oscillating said stage about a displaceable pivot axis, said illuminating means include a laser beam having a selected wavelength $\lambda$ and means for focusing said beam, said object is positioned within the focal volume of said focusing means, and said measuring and recording means include means for detecting said different frequency components, means for recording selected instantaneous attitudes of said stage, means for filtering out undesired frequencies, means for measuring the amplitude and phase of unfiltered frequency components, and means for correlating and storing said measuring amplitudes and phases, whereby recordings of radiation scattered from points on said object while in motion may be accumulated and related to radiation scattered from the object at rest.

3. The apparatus as defined in claim 2 wherein said pivot axis is displaceable parallel to its original position so that a one-dimensional image of said object may be constructed and displayed.

4. The apparatus as defined in claim 3 wherein said oscillation is sinusoidal and said detection is optical homodyne detection so that the amplitudes of the frequency components of the homodyne signal are given by Fourier analysis of the expression $$A_p = K \sum_{\eta=1}^{N} E_o E_\eta \cos [\alpha_\eta + \frac{4\pi}{\lambda} R_\eta^p \sin(\theta_m \sin \omega_\nu t)]$$

where K is a constant, $E_o$ is the amplitude of said monochromatic radiation, $E_\eta$ is the amplitude of the radiation scattered from the $\eta^{th}$ point on the object, $\alpha_\eta$ is the quiescent difference in phase at said detecting means between the incident laser radiation and the radiation reflected from the $\eta^{th}$ point on the object, $R_\eta^p$ is the distance from the pivot axis position to the $\eta^{th}$ point on the object during the $p^{th}$ measurement, $\theta_m$ is the maximum angular excursion of the oscillating stage, and $\omega_\nu$ is the angular oscillation frequency of the stage.

5. The apparatus as defined in claim 4 wherein said pivot axis is oriented to a multiplicity of mutually non-parallel attitudes and a two-dimensional image of said object is constructed by superposition of the multiplicity of one-dimensional images thus obtained.

6. The apparatus as defined in claim 1 wherein said means for subjecting said stage to motion include at least two electromechanical transducers connected one at each end of said stage and means for driving said transducers and oscillating said stage ends respectively according to the expressions $A_1 \sin \omega_m t$ and $A_2 \sin (\omega_m t + \pi)$ where $A_1$ and $A_2$ are respective amplitudes and $\omega_m$ is the frequency of oscillation, said illuminating means include a laser beam having a selected wavelength $\lambda$ and means for focusing said beam, said object is positioned within the focal volume of said focusing means, and said measuring and recording means include means for detecting said different frequency components, means for recording selected instantaneous attitudes of said stage, means for filtering out undesired frequencies, means for measuring the amplitude and phase of unfiltered frequency components, and means for correlating and storing said measured amplitudes and phases, whereby recordings of radiation scattered from points on said object while in motion may be accumulated and related to radiation scattered from said object at rest.

7. The apparatus as defined in claim 6 wherein said transducers are driven respectively according to the expressions $A_1 = X\theta_m$ and $A_2 = (D_1 - X)\theta_m$ where $\theta_m$ is the constant maximum angular excursions of said stage, $D_1$ is the distance between the connecting points of said transducers, and X is the distance from the pivot axis induced by motion of said transducers to one of said connecting points, whereby the pivot axis of said stage may be selectively positioned between said connecting points by varying $A_1$ and $A_2$ in conformance with said last mentioned expressions, permitting a one-dimensional image of said object to be constructed and displayed.

8. The apparatus as defined in claim 7 and further including a second pair of transducers connected to said stage so that a line joining said second pair is orthogonal to a line joining the first pair of transducers; and means for driving said second pair of transducers respectively according to the expressions $A_3 = Y\theta_m$ and $A_4 = (D_2 - Y)\theta_m$ where $A_3$ and $A_4$ are respective amplitudes, $D_2$ is the distance between the connecting points of said second pair, and Y is the distance from the pivot axis induced by motion of said second pair to one of the connecting points thereof so that by independently varying X and Y two arbitrary orthogonal axes of oscillation of said stage are produced which provide respective linearly displaced amplitudes and phases of scattered reflected radiation and permit construction of two-dimensional images of said object.

9. The apparatus as defined in claim 1 wherein said means for subjecting said stage to motion include three electromagnetic transducers connected to said stage spaced from said object at each of three noncollinear positions; and means for driving said transducers and vibrating said stage respectively according to the expressions $A_1 \sin(\omega_m t + \phi_1)$, $A_2 \sin(\omega_m t + \phi_2)$ and $A_3 \sin(\omega_m t + \phi_3)$ where $A_1$, $A_2$ and $A_3$ are respective amplitudes, $\omega_m$ is the vibration frequency, and $\phi_1$, $\phi_2$, and $\phi_3$ are respective phases of said vibrations;

said illuminating means including a laser beam having a selected wavelength $\lambda$ and means for focusing said beam, said object being positioned within the focal volume of said focusing means, said measuring and recording means including means for detecting said different frequency components;

means for recording selected instantaneous attitudes of said stage;

means for filtering out undesired frequencies;

means for measuring the amplitude and phase of unfiltered frequency components; and means for correlating and storing said measured amplitudes and phases, whereby the relative excursions and phases of the points of connection of said transducers may be controlled during vibratory motion of said stage by adjusting $A_1$, $A_2$ and $A_3$ and $\phi_1$, $\phi_2$ and $\phi_3$ thereby controlling the position of the pivot point and permitting a two-dimensional image of said object to be constructed and displayed.

10. The apparatus as defined in claim 9 and further including means for constructing and displaying said two-dimensional image by providing a signal output corresponding to the at rest amplitude and phase contribution from each reflecting point on said object and supplying said signal to an x-y retention scope having a spot intensity proportional to $E_\eta'^2$ where $E_\eta'$ is the total amplitude of the radiation reflected by the $\eta^{th}$ point on said object.

11. A method of determining two-dimensional submicroscopic surface characteristics of an object comprising the steps of:

subjecting said object to a series of different states of motion, each state of motion being such that each point on said object experiences a movement that is different from that experienced by any other point thereon, each state of motion also being such that the particular movement of any point on said object is uniquely related to the distance of that point from a known stationary reference point;

illuminating said object with coherent monochromatic radiation of known amplitude and frequency, the radiation scattered from said object consisting of a multiplicity of different frequency components as a result of the states of motion of said object;

measuring the amplitude and phase of selected ones of said different frequency components for each different state of motion;

calculating from said measured amplitudes and phases and the known relationship between the contributions to each frequency component from each said point for each of state of motion, the amplitude and phase of the radiation scattered from each point on said object when said object is stationary; and constructing the shape of said object from said calculations.

12. A method of determining one dimensional submicroscopic surface characteristics of an object comprising the steps of:

subjecting the object to a series of different states of motion, each state of motion being such that lines of points on said object experience a movement different from that experienced by any other parallel line points thereon, each state of motion also being such that the particular movement of any line of points on said object is uniquely related to the distance of that line of points from a known stationary reference line of points, illuminating said object with coherent monochromatic radiation of known amplitude and frequency, the radiation scattered from said object consisting of a multiplicity of different frequency components as a result of the states of motion of said object;

measuring the amplitude and phase of selected ones of said different frequency components for each different state of motion;

calculating from said measured amplitudes and phases and the known relationships between the contributions to each frequency component from each said line of points for each said state of motion, the amplitude and phase of the radiation scattered from each line of points on said object when said object is stationary; and constructing a one-dimensional image of said object from said calculations.

13. Apparatus for determining the submicroscopic surface characteristics of an object which is mounted on a stage with the face to be examined exposed comprising:

means for illuminating the exposed areas of said object with coherent monochromatic radiation of known amplitude and frequency;

means for establishing a series of different relative states of motion between said stage and the radiation illuminating said object, each state of motion being such that each point on said object experiences a relative movement that differs from that experienced by any other point thereon, each state of motion also being such that the particular relative movement of any point on said object is uniquely related to the distance of that point from a known stationary reference point, the radiation scattered from said object consisting of a multiplicity of different frequency components as a result of each state of relative motion of said object;

means for measuring the amplitude and phase of selected ones of said different frequency components for each different state of motion;

means for determining from said measured amplitudes and phases and the known relationship between the contributions to each frequency component from each said point for each state of motion the amplitude and phase of the radiation scattered from each point on said object in the absence of relative motion;

means for obtaining a signal output corresponding to the amplitude and phase of the radiation scattered from each point on said object in the absence of relative motion; and means for forming a graphic display of said object from said signal outputs.

14. The apparatus as defined in claim 13 wherein the radiation illuminating said object impinges thereon at a direction other than normal to said stage to avoid detection of specularly reflected radiation components.

15. The apparatus as defined in claim 13 wherein said illuminating means is a laser beam having a wavelength $\lambda$ and said means for establishing different states of relative motion include an oscillating mirror-lens assembly disposed in the path of said beam immediately adjacent said stage and means for translating said stage transverse to the central direction of incidence of said laser beam on said object.

16. A system for determining one-dimensional submicroscopic surface characteristics of an object which is mounted on a stage having a resolution grid associated therewith comprising:

means for illuminating said object with a laser beam having a selected wavelength $\lambda$ and means for focusing said beam so that said object is within the focal volume of said focusing means;

means for oscillating said stage about a displaceable pivot axis and means for translating said pivot axis transverse to the central direction of incidence of said laser beam on said object to different reference grid positions to provide a multiplicity of different phase and amplitude values for each reflected frequency component produced by said stage oscillations;

means for splitting the transmitted laser beam into a reference beam and an object illuminating beam and for subsequently recombining the reflected portion of said object illuminating beam with said reference beam to form co-collimated beams for further processing;

means for detecting said frequency components and filtering out undesired frequencies; and means for unambiguously measuring and recording the amplitudes and phases of selected frequency components of the radiation reflected from said object to determine the at rest radiation scattered from respective lines of points on said object so that an image of said object may be constructed.

17. The system as defined in claim 16 wherein said stage is sinusoidally oscillated with an instantaneous angular amplitude represented by the expression $\theta_m \sin \omega_\nu t$ where $\theta_m$ is the maximum angular excursion and $\omega_\nu$ is the angular oscillation frequency, said beam splitting-recombining means is an optical beam splitter and a mirror arranged to retroreflect the impinging beam component that is reflected by the beam splitter, said detecting means includes a square-law optical homodyne detector for wavelength $\lambda$ and an audio frequency electrical signal amplitude detector, said filtering means is an audio filter with multiple passbands at selected multiples of $\omega_\nu$, and said measuring and recording means include an electrically controlled translatable retroreflecting mirror mount for successively increasing and decreasing the propagation path of said reference beam by $\lambda/4$ prior to formation of said co-collimated beams, means for calculating the at rest amplitudes and phases of radiation reflected from each line of points on said object from the known relationship between the contributions to each selected frequency component from radiation reflected from each line of points for motion with said pivot axis at each resolution grid position of said stage, and means for constructing the shape of said object from said at rest amplitude and phase information.

18. The system as defined in claim 17 wherein $\theta_m$ is small so that the amplitude of the $\omega_\nu$ frequency component passing through said audio filter when said pivot axis is at grid position p is defined substantially precisely by the expression $$A_p^c(\omega_\nu) = \sum_{\eta=1}^{N} E_\eta \cos \alpha_\eta J_1(X_\eta^p)$$

wherein K is a constant, N is the number of grid positions, $E_\eta$ is the total at rest amplitude of the radiation scattered from that portion of said object which lies at the $\eta^{th}$ grid position, $\alpha_\eta$ is the at rest difference in phase at said detector between said reference beam and the radiation reflected from that portion of said object which lies at the $\eta^{th}$ grid position, and $J_1(X_\eta^p)$ is the first order Bessels function with argument $$X_\eta^p = \frac{8\pi}{\lambda} R_\eta^p J_1(\theta_m)$$

where $R_\eta^p$ is the distance from grid position $\eta$ to grid position p, and $J_1(\theta_m)$ is the first order Bessels function with argument $\theta_m$, wherein increasing the propagation path of said reference beam by $\lambda/4$ prior to formation of said co-collimated beams through use of said measuring and recording means increases the values of all $\alpha_\eta$'s by $\pi/2$, thus providing frequency component amplitudes given by the expression $$A_p^s(\omega_\nu) = K \sum_{\eta=1}^{N} E_\eta \sin \alpha_\eta J_1(X_\eta^p)$$

and wherein said measuring and recording means measures and records N values of $A_p^c(\omega_\nu)$ and $A_p^s(\omega_\nu)$ with said pivot axis at N different grid positions, p, mathematically inverts said expressions for $A_p^c(\omega_\nu)$ and $A_p^s(\omega_\nu)$ to yield values of $E_\eta \sin \alpha_\eta$ and $E_\eta \cos \alpha_\eta$ for $1 \leq \eta \leq N$, and uses known trigonometric identities to extract therefrom separate values of all $E_\eta'^2$ and $\alpha_\eta$'s, thereby permitting construction of a one-dimensional image.

19. The system as defined in claim 16 and further including means for verifying the positions of said pivot axis by establishing a reference target on said stage positioned outside of said focal volume, deflecting a portion of said laser beam so as to illuminate said target, and including in said detecting and measuring and recording means means for heterodyning radiation reflected from said target with said reference beam to provide a high frequency signal that is receivable by said detecting means and which has a phase that depends upon said pivot axis position, and measuring said phase to precisely determine and verify said pivot axis position from the value thus obtained.

20. The system as defined in claim 19 wherein said deflected beam is produced by means of an acousto-optical beam deflector driven at radio frequency $\omega_{os}$, said heterodyning means includes a mirror having a first reflecting surface for co-collimating said reference beam and the reflected portion of said object illuminating beam and a second reflecting surface for co-collimating said reference beam and the reflected portion of said deflected beam so that both pairs of co-collimated beams impinge upon said detecting means with the former pair giving rise to an audio frequency homodyne electrical signal with frequency components near $\omega_v$ and the latter pair giving rise to a radio frequency heterodyne electrical signal with frequency components near $\omega_{os}$, and electrical signal frequency filtering means for separating said radio frequency signal from said audio frequency signal so that said pivot axis positions can be precisely determined and verified from the phase of said radio frequency heterodyne signal.

* * * * *